United States Patent [19]

Miki

[11] Patent Number: 4,982,314
[45] Date of Patent: Jan. 1, 1991

[54] POWER SOURCE CIRCUIT APPARATUS FOR ELECTRO-LUMINESCENCE DEVICE

[75] Inventor: Yuuji Miki, Anan, Japan

[73] Assignee: Nichia Kagaku Kogyo K.K., Tokushima, Japan

[21] Appl. No.: 444,956

[22] Filed: Dec. 4, 1989

[30] Foreign Application Priority Data

Dec. 9, 1988 [JP] Japan ............... 63-160724[U]
Mar. 16, 1989 [JP] Japan ............... 1-65536
Aug. 11, 1989 [JP] Japan ............... 1-208610
Aug. 19, 1989 [JP] Japan ............... 1-213901
Aug. 23, 1989 [JP] Japan ............... 1-98857[U]

[51] Int. Cl.$^5$ .................. H02M 3/335; G05F 1/00
[52] U.S. Cl. ................... 363/16; 363/124; 363/134; 323/224; 323/266; 315/169.3
[58] Field of Search ............ 363/16, 80, 89, 124, 363/131, 133, 134; 323/266, 224; 315/169.3

[56] References Cited

U.S. PATENT DOCUMENTS

| 4,161,023 | 7/1979 | Goffeau ............... 363/124 |
| 4,212,053 | 7/1980 | Sichenzia ............. 363/16 |
| 4,482,848 | 11/1984 | Heal et al. .......... 363/124 |
| 4,595,861 | 6/1986 | Simopoulos et al. .... 315/169.3 |
| 4,633,141 | 12/1986 | Weber ................. 315/169.3 |
| 4,812,736 | 3/1989 | Albach et al. ........ 323/266 |
| 4,859,911 | 8/1989 | Kinnard et al. ....... 315/169 |

FOREIGN PATENT DOCUMENTS

61-30230  9/1886  Japan .
53-65682  6/1978  Japan .
62-502009 8/1987  Japan .
63-202888 8/1988  Japan .

Primary Examiner—Peter S. Wong
Attorney, Agent, or Firm—Nixon & Vanderhye

[57] ABSTRACT

A low DC voltage supplied to a low DC voltage receiving terminal is converted into a high DC voltage by a DC-DC step-up circuit. The obtained high DC voltage has an optimal value for driving an electro-luminescence device. This high DC volatage is converted into an AC voltage through a pair of series-connected transistors in a switching circuit ON/OFF-controlled in response to an oscillation output from a multivibrator. The converted voltage is supplied to the electro-luminescence device through a series resonance circuit including the electro-luminescence device and a reactor as an AC drive voltage. At this time, a resonance voltage is fed back to the multivibrator and the switching circuit so as to obtain an appropriate luminance correction capability.

8 Claims, 8 Drawing Sheets

FIG. 12

POWER SOURCE CIRCUIT APPARATUS FOR ELECTRO-LUMINESCENCE DEVICE

BACKGROUND OF THE INVENTION

1. Field of the Invention

The present invention relates to a power source circuit apparatus for an electro-luminescence device having a DC-DC step-up circuit and a DC-AC converter.

2. Description of the Related Art

A liquid crystal display (LCD) has been used as a display unit of a conventional computer of, e.g., a laptop type for the purpose of saving power consumption. In this case, an electro-luminescence panel is arranged behind a transparent liquid crystal layer. When a light emitted from the electro-luminescence panel passes through the liquid crystal layer, a high-brightness display screen can be obtained.

An electro-luminescence panel of this type is normally energized using an AC voltage of several tens to several hundreds volts. In addition, since this panel has characteristics that brightness is improved when a frequency of an AC voltage is increased, an AC voltage of several hundreds Hz to several kHz is used. On the other hand, in a lap-top computer, a battery is normally used as a DC power source of several volts. Therefore, in order to energize the electro-luminescence panel, a DC-AC converter is used to generate an AC voltage of several hundreds volts from a DC voltage of several volts. For example, such a power source circuit for an electro-luminescence panel is disclosed in U.S. patent application Ser. No. 014894 filed on Feb. 13, 1987, now U.S. Pat. No. 4,859,911.

The power source circuit disclosed in the specification of the above U.S. patent application includes a DC (low voltage)-DC (high voltage) inverter, and a series resonance power oscillator energized in response to an output from the inverter. This power source circuit has an arrangement in which an electro-luminescence panel is used as a capacitance which constitutes the series resonance circuit together with an inductance as a load of the series resonance power oscillator.

The above conventional power source circuit includes, in the series resonance power oscillator, a switching circuit for converting a high DC voltage into a high AC voltage, and supplying the high AC voltage to the electro-luminescence panel. In this switching circuit, two transistors are connected to each other at their emitters, and these transistors are alternately turned on/off, thus supplying the high AC voltage to the electro-luminescence panel. The power oscillator, however, should be supplied with pulse signals at the start of the power oscillator, whereby complicating its circuit structure. Moreover, switching transistors having large DC current amplification factor (hfe) should be used for obtaining large oscillation power outputs. On the other hand, it is necessary to use large capacity transistors for driving a large-sized electro-luminescence panel with high luminance. However, since it is not available a large capacity transistor having large DC current amplification factor ($h_{fe}$), it is not possible to provide a power oscillator capable of energizing a large-sized electro-luminescence panel. In other words, the size of the electro-luminescence panel which can be used as a load of the conventional power oscillator is limited.

SUMMARY OF THE INVENTION

It is an object of the present invention to provide a power source circuit apparatus for an electro-luminescence device which can energize a relatively large-sized electro-luminescence device of high luminance.

It is another object of the present invention to provide a power source circuit apparatus for an electro-luminescence device having an arrangement for preventing a decrease in light-emitting amount of the electro-luminescence device over time, and for keeping a long life of the electro-luminescence device.

It is still another object of the present invention to provide a power source circuit apparatus for an electro-luminescence device for achieving a high brightness of an electro-luminescence device for a long period of time, and keeping a duty factor of an AC rectangular wave supplied to the device at approximately 50%.

It is still another object of the present invention to provide a power source circuit apparatus for an electro-luminescence device with a very simple arrangement, for effectively supplying power to the electro-luminescence device, employing a switching element having a low breakdown voltage, and allowing efficient light emission of the device.

According to one aspect of the present invention, there is provided an electro-luminescence device lighting inverter comprising:

(a) a DC-DC step-up circuit for boosting an input DC voltage to an electro-luminescence device lighting DC output voltage, and (b) a DC-AC converter for converting the DC output voltage from the DC-DC step-up circuit into an AC output voltage; wherein (c) the DC-AC converter is provided with an electro-luminescence device lighting oscillation circuit and a switching circuit, controlled in response to an output signal from the electro-luminescence device lighting oscillation circuit, for converting the DC output voltage from the DC-DC step-up circuit into the AC output voltage, and supplying the AC output voltage to the electro-luminescence device; and (d) the switching circuit includes transistors ON-/OFF-controlled in response to the output signal from the electro-luminescence device lighting oscillation circuit.

DETAILED DESCRIPTION OF THE PREFERRED EMBODIMENTS

Preferred embodiments of the present invention will be described hereinafter with reference to the accompanying drawings.

Figures 1, 3:
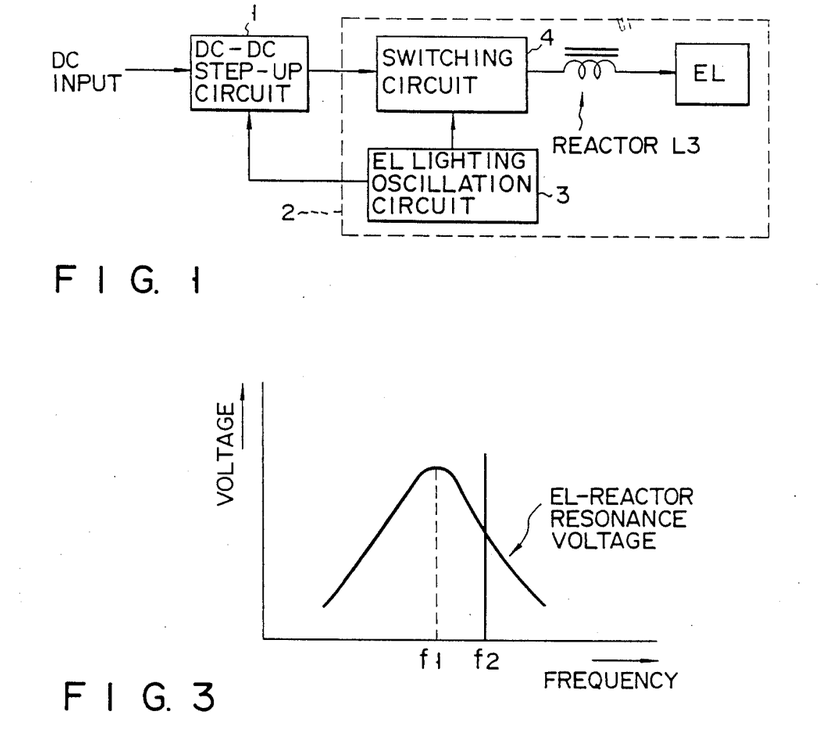
FIG. 1 is a block diagram showing a power source circuit apparatus for an electro-luminescence device according to embodiment of the present invention.
FIG. 3 is a graph for explaining an operation of the circuit according to the embodiment shown in FIG. 2.

An inverter for lighting an electro-luminescence device (to be referred to as an EL device hereinafter) according to an embodiment shown in FIGS. 1 to 3 includes a DC-DC step-up circuit 1 for boosting a DC input voltage of several volts to an EL device lighting DC voltage of several hundreds volts, and a DC-AC converter 2 for converting the EL device lighting DC voltage from the DC-DC step-up circuit 1 into an AC output voltage of several hundreds volts.

Figure 2:
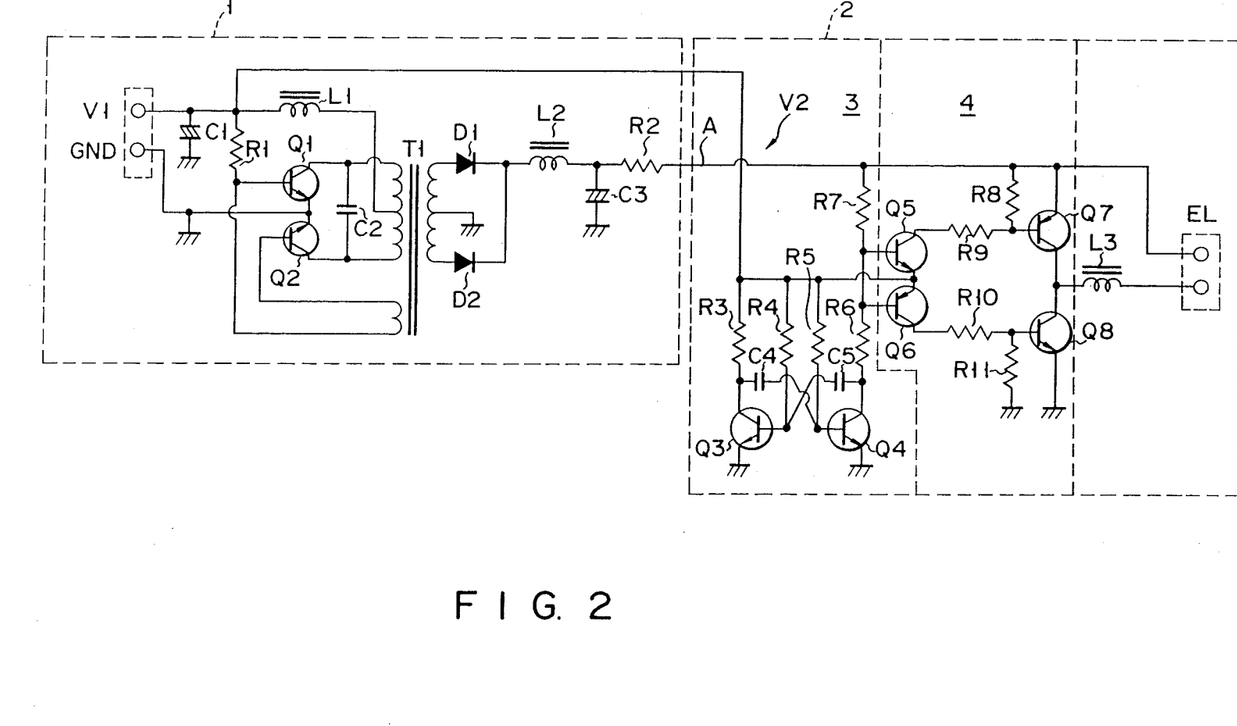
FIG. 2 is a circuit diagram showing a detailed arrangement of the embodiment shown in FIG. 1.

In the EL lighting inverter according to the embodiment shown in FIG. 2, a Royer circuit including transistors Q1 and Q2, a transformer T1, diodes D1 and D2, and reactors L1 and L2 is used as the DC-DC step-up circuit 1. As the DC-DC step-up circuit 1, another known circuit for boosting a supplied low DC voltage to an EL lighting voltage can be used.

An oscillation frequency of the DC-DC step-up circuit 1 is controlled to be more than an audible frequency, normally 20 kHz or more, and preferably 50 kHz or more. The oscillation frequency of the DC-DC step-up circuit 1 can be controlled in accordance with the number of turns of the primary winding of the transformer T1. When this number of turns is decreased, the oscillation frequency is increased. Capacitor C3 and Resistor R2 constitute a smoothing circuit for outputting the high DC output voltage.

The DC-AC converter 2 includes an EL lighting oscillation circuit 3, and a switching circuit 4, controlled in response to an output signal from the EL lighting oscillation circuit 3, for converting the DC output voltage from the DC-DC step-up circuit 1 into the AC output voltage, and supplying the AC output voltage of several hundreds volts to an EL device EL.

The EL lighting oscillation circuit 3 is constituted by a free-running multivibrator including transistors Q3 and Q4, resistors R3, R4, R5, R6, and R7, and capacitors C4 and C5.

An oscillation frequency of the EL lighting oscillation circuit 3 is controlled to be an optimal value for EL lighting, e.g., several hundreds Hz to several kHz. The oscillation frequency can be controlled by the resistors R4 and R5 and the capacitors C4 and C5.

The larger the values of the resistors R4 and R5 and the smaller the values of the capacitors C4 and C5 are, the higher the oscillation frequency of the EL lighting oscillation circuit 3 or vice versa.

The switching circuit 4 includes transistors Q5, Q6, Q7, and Q8, and resistors R8, R9, R10, and R11. The switching circuit 4 includes the series-connected transistors Q7 and Q8 for converting the DC output voltage from the DC-DC step-up circuit 1 into the AC output voltage.

The emitters of the transistors Q5 and Q6 in the switching circuit 4 are connected to a virtual ground point arranged between a node A of an output voltage V2 of the DC-DC step-up circuit 1 and ground, i.e., to a DC input terminal V1 in FIG. 2. The bases of the transistors Q5 and Q6 are connected to an intermediate point between the load resistances R6 and R7 in the EL lighting oscillation circuit 3.

When the transistor Q4 is turned on/off during an oscillating operation of the multivibrator, the transistors Q5 and Q6 are repeatedly and alternately turned on/off. The bases and emitters of the transistors Q5 and Q6 are respectively commonly connected to each other. Therefore, a moment at which both the transistors are turned off is necessarily present during an ON/OFF-switching time period in which one is turned on and the other is turned off. The transistors Q7 and Q8 are driven by outputs of the transistors Q5 and Q6, respectively. In other words, the transistor Q7 is controlled to turn on only when the transistor Q5 is ON, and the transistor Q8 is controlled to turn on only when the transistor Q6 is ON.

The transistors Q7 and Q8 respectively driven by the transistors Q5 and Q6 are also not simultaneously turned on, thus preventing short-circuiting between power source terminals.

The transistors Q7 and Q8 supply power to the EL device EL through a reactor L3. These transistors Q7, Q8 are operated in a perfect ON/OFF state obtained by a switching operation, thereby achieving low power consumption and use of transistors of small current capacity.

Series resonance circuit is formed with the reactor L3 and a capacitance of the EL device EL, and a rectangular wave voltage obtained by switching the transistors Q7 and Q8 is converted into a substantial sine-wave voltage. As shown in FIG. 3, a series resonance frequency f1 of the reactor L3 and the EL device EL is selected to be lower than an oscillation frequency f2 of the EL lighting oscillation circuit 3. Therefore, an output voltage of the series resonance circuit will be increased upon decrease in capacitance and luminance of the EL device EL over time, thus performing luminance correction.

Although not shown, when the EL lighting oscillation circuit 3 is externally triggered in place of using the free-running multivibrator of FIG. 2, a flicker which occurs when this circuit is combined with an LCD can be prevented.

Figure 4:
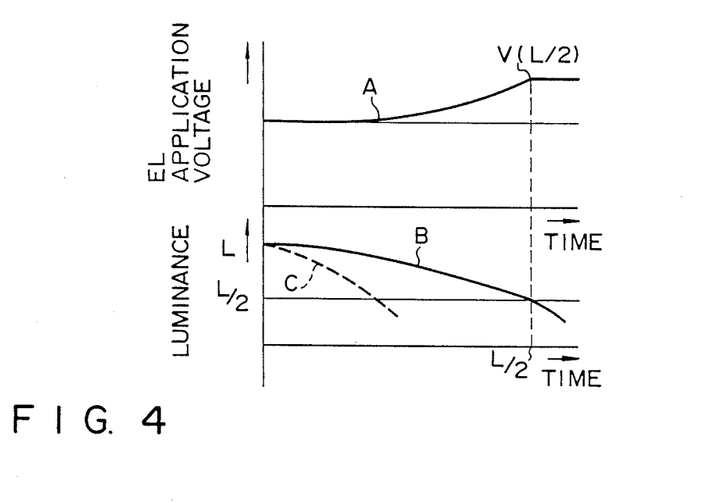
FIG. 4 is a graph showing a relationship between an application voltage and a change in luminance in the electro-luminescence device.

The EL lamp EL is degraded over time, and its luminance is gradually reduced, as shown by curves C and B in FIG. 4. This is because a light-emitting element in the EL lamp EL is degraded, and the luminance is reduced. In addition, as the EL lamp EL is degraded, a current supplied to the lamp EL is decreased. This decrease causes a reduction in luminance. A current is decreased because a capacitance of the EL lamp EL is decreased over time. Therefore, when the EL lamp EL is driven by a power source having a constant voltage and frequency, the luminance is noticeably reduced within a short period of time, as shown by curves C in FIG. 4.

Figure 5:
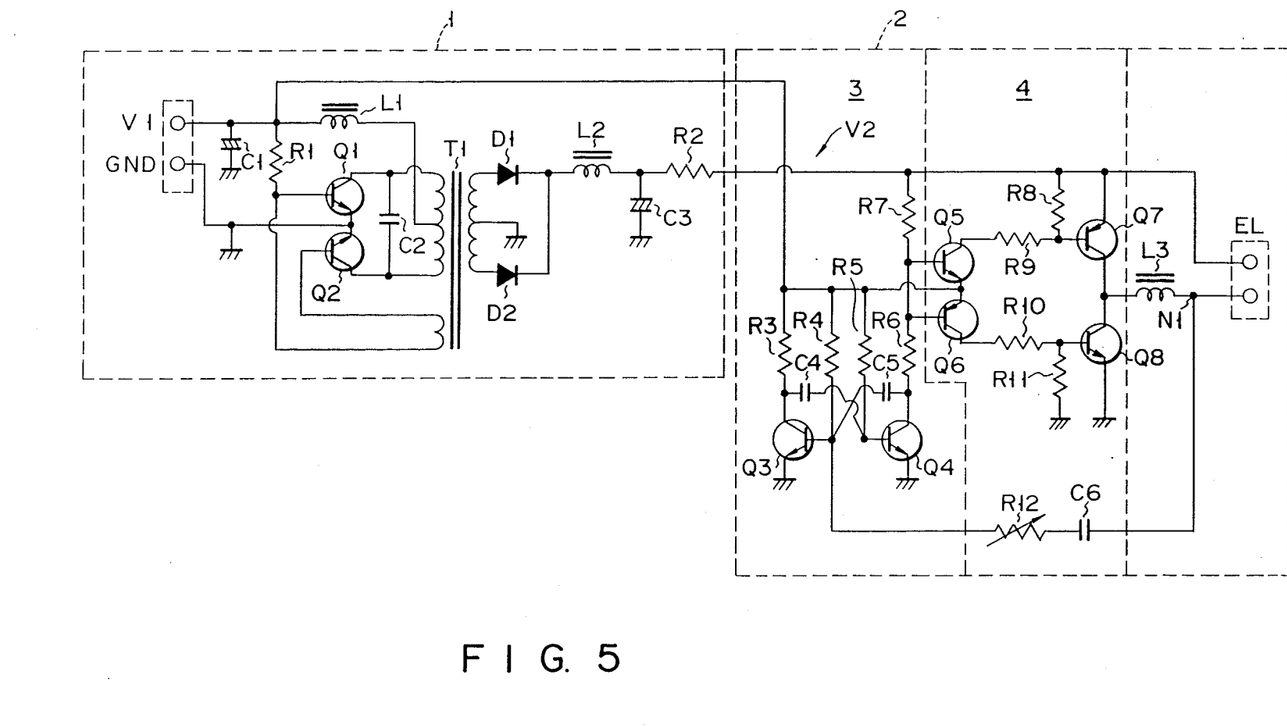
FIG. 5 is a circuit diagram according to another embodiment.

In the arrangement shown in FIG. 5, the characteristics of the EL lamp EL, i.e., it becomes brighter as a frequency of supplied power is increased, are effectively utilized. When a frequency supplied to the EL lamp EL is increased in accordance with the time of use, a reduction in luminance of the EL lamp EL which occurs over time is prevented. In the embodiment of FIG. 5, circuit elements corresponding to those in FIG. 2 are given with the same reference characters.

More specifically, in the inverter circuit shown in FIG. 5, the reactor L3 is connected to the EL lamp EL, and the resonance frequency between the EL lamp EL and the reactor L3 is increased as the EL lamp EL is degraded and the capacitance through is decreased.

The inverter of this type controls to set a power source frequency of the EL lamp EL high upon degradation of the EL lamp EL. Therefore, this inverter has an advantage of keeping high brightness of the EL lamp EL for a long time period. As shown by the curve A in FIG. 4, in the inverter of this type, however, when a capacitance of the EL lamp EL is decreased, a voltage applied to the EL lamp EL is extremely increased, and the EL lamp EL is easily subjected to insulation breakdown. This is because, if the EL lamp EL is degraded, the Q value of the series resonance circuit of the EL lamp EL and the reactor L3 is increased.

The Q value of the series resonance circuit constituted by the EL lamp EL and the reactor L3 is increased in proportion to the frequency. When an equivalent parallel resistance of the EL lamp EL is increased, the Q value is also increased. As the equivalent parallel resistance of the EL lamp EL and the frequency of the series resonance circuit are increased, the Q value of the series resonance circuit is increased. A voltage applied across the terminals of the EL lamp EL is increased in proportion to the Q value of the resonance circuit constituted by the EL lamp EL and the reactor L3.

The capacitance of the EL lamp EL is decreased in accordance with the time of use, and the resistance value of the equivalent parallel resistance is increased. Therefore, in this inverter, as the EL lamp EL is degraded, an oscillation frequency and the parallel resistance are increased, and the Q value is gradually increased. For this reason, a voltage applied across the terminals of the EL lamp EL is noticeably increased to cause insulation breakdown.

In the embodiment shown in FIG. 5, in order to pull in an oscillation frequency of the oscillation circuit 3 into a resonance frequency of a resonance circuit, feedback is performed from a voltage generating point N1 of the series resonance circuit consisting of an EL lamp EL and a reactor L3 to the oscillation circuit 3. An inverter shown in FIG. 5 performs feedback from the node N1 between the reactor L3 and the EL lamp EL to the oscillation circuit 3 through a variable resistor R12 and a capacitor C6.

The variable resistor R12 controls a feedback amount from the resonance circuit of the EL lamp EL and the reactor L3. If a resistance value of the resistor R12 is low, the feedback amount is increased, and the oscillation frequency of the oscillation circuit 3 is more strongly pulled into the resonance frequency. In contrast to this, when a resistance of the resistor R12 is high, a feedback amount from the resonance circuit of the EL lamp EL and the reactor L3 is decreased, and the oscillation frequency is pulled in only weakly. As a result, the oscillation circuit 3 is oscillated at a frequency substantially equal to a free-running oscillation frequency.

The variable resistor R12 is adjusted to control a feedback amount from the resonance circuit of the EL lamp EL and the reactor L3 to the oscillation circuit 3.

When the EL lamp EL is degraded over time, a capacitance component thereof is decreased. A resonance frequency is increased with this change to move to a new optimal point of the oscillation circuit 3. For this reason, a frequency and a voltage of AC power supplied to the EL lamp EL are gradually increased, and a reduction in luminance can be suppressed for a long time period.

The thickness of the entire EL lamp EL is very small, i.e., an interelectrode interval is small. In addition, an application voltage is extremely high, i.e., several tens to several hundreds volts, as compared with those of other electronics parts in the lap-top computer, for example. Therefore, if the application voltage is increased, a very dangerous state may occur.

In the inverter having the following arrangement, a voltage limiting element such as a varistor is connected in parallel with the EL lamp or the reactor to limit a peak of a voltage applied to the EL lamp.

The voltage limiting element connected in parallel with the EL lamp limits a peak value of a voltage applied to the EL lamp. When a voltage having a predetermined value or more is applied across the voltage limiting element, a resistance is decreased, or the two terminals thereof are electrically connected, thus limiting a maximum voltage across of EL lamp.

The voltage limiting element connected in parallel with the reactor decreases the Q value of the series resonance circuit constituted by the reactor and the capacitance of the EL lamp, thus limiting a peak value of a voltage applied to the EL lamp.

Figure 6:
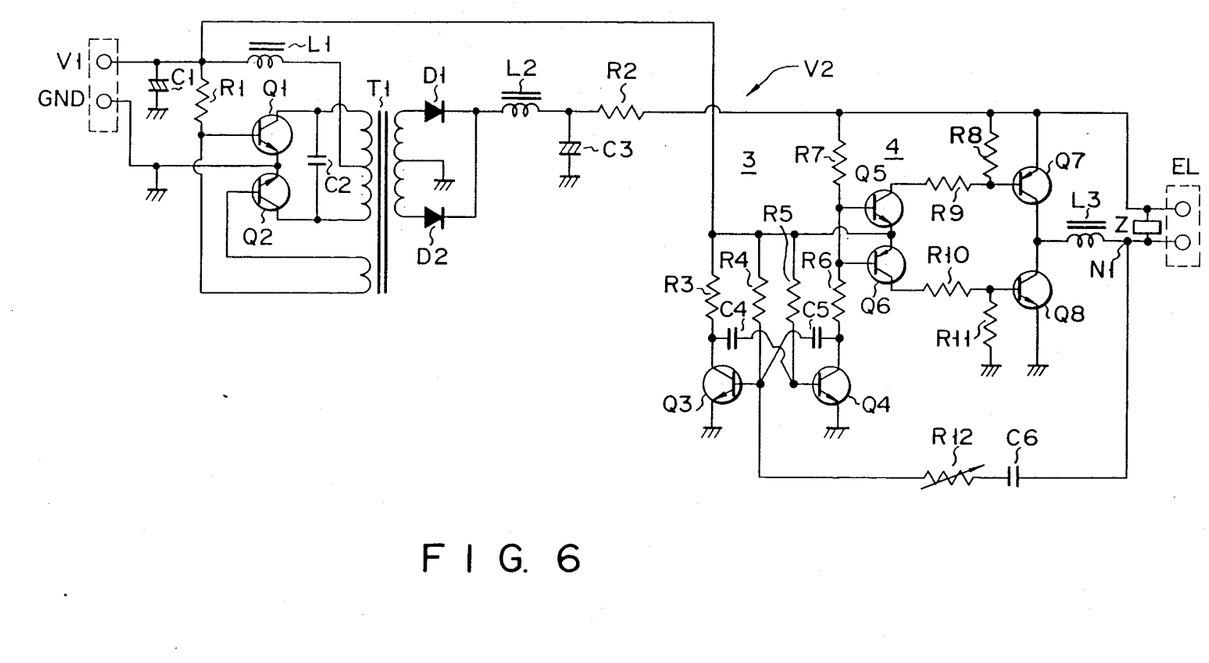
FIGS. 6 and 7 are circuit diagrams showing an arrangement with a means for limiting a voltage to be applied to the electro-luminescence device.

In the inverter shown in FIG. 6, a voltage limiting element Z is connected in parallel with the EL lamp. For example, a varistor, a Zener diode, a surge absorber, or a voltage regulator tube can be used as the voltage limiting element Z. As the voltage limiting element, all elements in which a resistance is decreased or two terminals are conducted at a predetermined voltage can be used.

A voltage required to render the voltage limiting element conductive is preferably controlled to be higher than a voltage V(L/2) applied to the EL lamp during a half period L/2 as shown in FIG. 4, and to be lower than an insulation breakdown voltage of the EL lamp.

When the voltage limiting element Z is rendered conductive in the case of FIG. 6 embodiment, the resistance connected in parallel with the EL lamp EL is decreased, and two terminals of the EL lamp are short-circuited, thus limiting a maximum voltage applied to the EL lamp EL.

Figure 7:
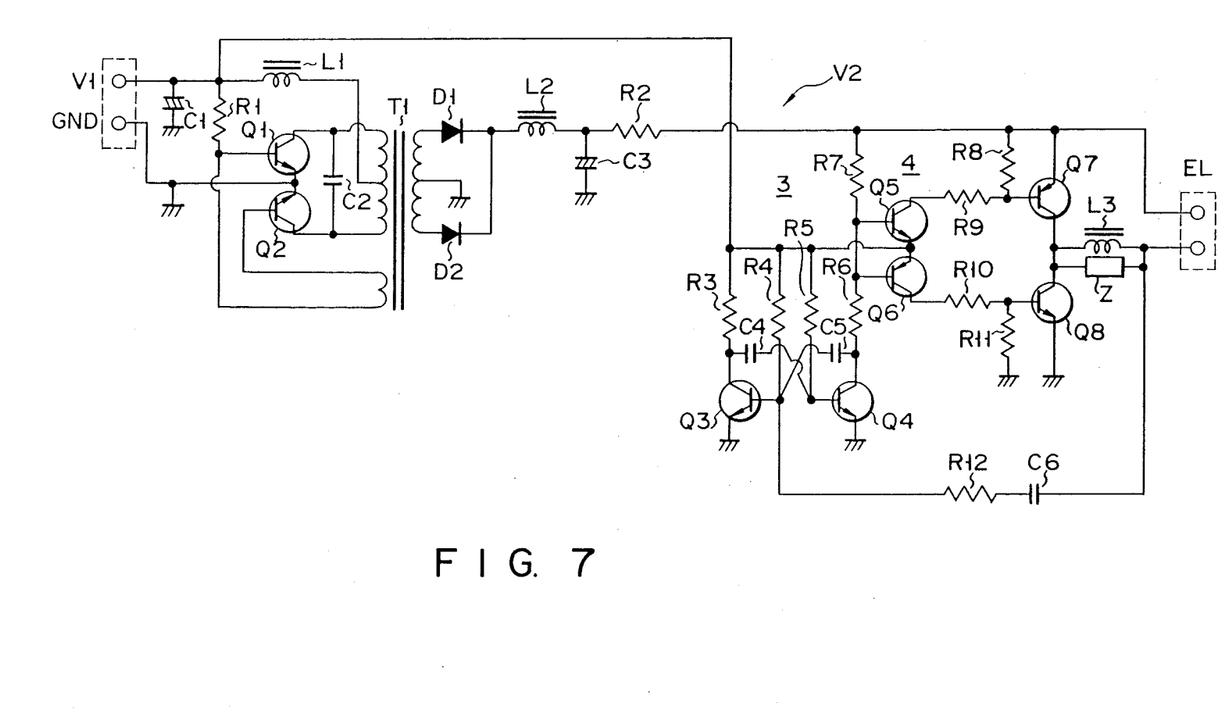

In the embodiment of FIG. 7, the voltage limiting element Z is coupled in parallel with the reactor L3 connected in series with the EL lamp EL. The voltage limiting element Z connected to the reactor L3 in this state decreases a parallel connection resistance of the reactor L3 and the Q value of the series resonance circuit. When the Q value of the resonance circuit is decreased, a voltage applied to the EL lamp EL is reduced, thus protecting the EL lamp EL from insulation breakdown.

The inverter according to the respective embodiments shown in FIGS. 5 to 7 has a disadvantage that a distortion of an AC voltage supplied to the EL lamp EL is increased due to feedback from the resonance circuit to the oscillation circuit 3. This is because, as an oscillation frequency of the multivibrator 3 is changed by feedback from the resonance circuit, a duty factor of a rectangular wave voltage which is an output voltage from the oscillation circuit 3 is shifted from 50%.

Figures 8, 9:
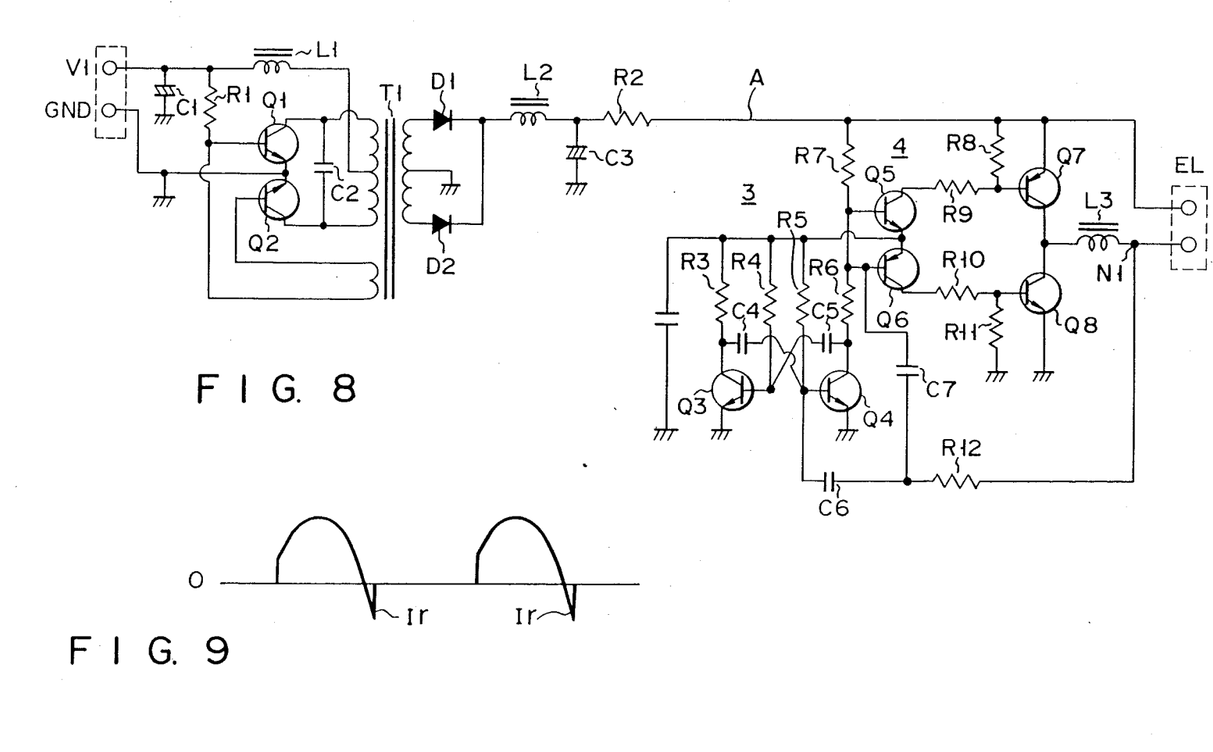
FIG. 8 is a circuit diagram according to still another embodiment of the present invention.
FIG. 9 is a graph showing a current waveform at a node A in the embodiment shown in FIG. 2.

In an inverter according to the embodiment shown in FIG. 8, feedback is also performed from a resonance circuit of an EL lamp EL and a reactor L3 to the input side of a switching circuit 4 in addition to an oscillation circuit 3. This feedback controls a timing at which switching elements Q5 and Q6 of the switching circuit 4 are turned on/off to set a duty factor of an output rectangular wave close to 50%. Therefore, the feedback input to the base of transistor Q6 via capacitor C7 has a function to cause a waveform of a voltage supplied to the EL lamp EL to approach a sine wave without distortion. The EL lamp EL to which the sine wave without distortion is supplied has an advantage of high efficacy, and a reduction in level of noise generated due to vibration of the EL lamp EL.

In other words, the inverter for the EL lamp EL in this embodiment of FIG. 8 has an advantage of efficiently lighting the EL lamp EL for a long time while keeping its high brightness by feedback from the resonance circuit of the EL lamp EL and the reactor L3 to the oscillation circuit 3 as well as to the switching circuit 4.

Thus, in the inverter shown in FIG. 8, feedback is performed from a voltage generating point or node N1 of the resonance circuit, i.e., the connection point between the EL lamp EL and the reactor L3 to the input side of the output circuit 4.

A feedback circuit includes a resistor R12, a capacitor C6 and a capacitor C7. The feedback is performed from the node N1 of the EL lamp EL and the reactor L3 to the bases of the transistors Q5 and Q on the input side of the switching circuit 4 through the series-connected resistor R12 and capacitor C7.

The resistor R12 and the capacitor C7 perform feedback of a part of sine wave voltage from the resonance circuit of the EL lamp EL and the reactor L3 to the bases of the transistors Q5 and Q6 in the switching circuit 4. This feedback controls a timing to alternately turn on/off transistors Q7 and Q8, and supplies a rectangular wave voltage having a duty factor of 50% to the load of the resonance circuit including the reactor L3 and the EL lamp EL.

The resonance circuit of the EL lamp EL and the reactor L3 to which a rectangular wave voltage having a duty factor of approximately 50% is supplied is energized by a sine wave without distortion, and a resonance effect is enhanced, thus efficiently lighting the EL lamp EL.

In this inverter, while the reactor L3 and the EL lamp EL serving as loads are resonated, a reverse current Ir caused by a reverse current flowing at the node A is generated, as shown in FIG. 9, since the energy stored in the reactor L3 is short-circuit through the switching elements Q7 and Q8, before the current flowing through the transistors Q7 and Q8 becomes zero.

When the switching elements Q7 and Q8 are turned on from an OFF state, therefore, this reverse current component must be supplied. Therefore, a current which instantly short-circuits the switching elements Q7 and Q8 flows. This current flow causes heat generation of the switching elements Q7 and Q8 to cause a degradation in efficiency.

An excessive current supplied to the switching elements Q7 and Q8 temporarily sets the switching elements Q7 and Q8 in an overload state. Therefore, a transistor which can withstand a large current must be used as the switching element.

Figure 10:
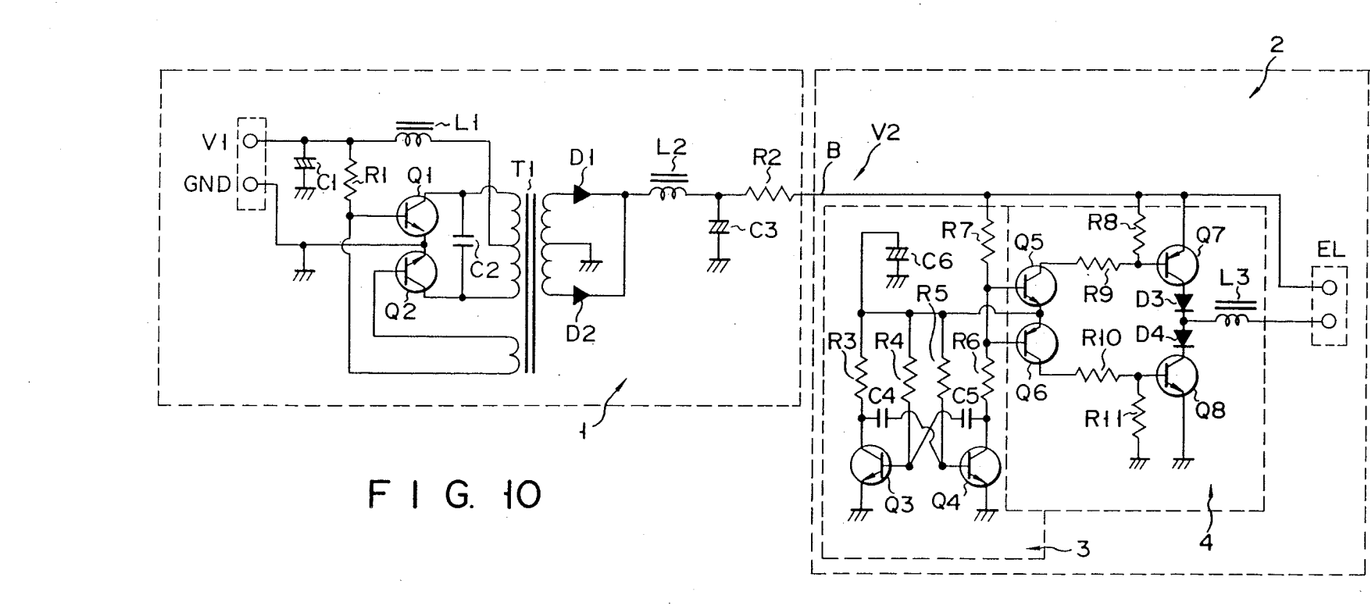
FIG. 10 is a circuit diagram according to still another embodiment of the present invention.

In an inverter according to the embodiment shown in FIG. 10, a transistor Q7 is turned on simultaneously as a transistor Q8 is turned off. There is no open state in the switching circuit while a current is supplied to the load. This is because an in-phase rectangular wave voltage is input to both the transistors. If a leading edge of the rectangular wave input voltage to both the transistors Q7 and Q8 raises very abruptly, and an ON/OFF time of each transistor is "0", the transistor Q7 is turned on without a delay after the transistor Q8 is turned off. Note that the leading edge of the rectangular wave voltage is not perfectly vertical with respect to the time axis, in practice, and the ON/OFF time of each transistor is not "0". Therefore, after the transistor Q8 is turned off, the transistor Q7 is turned on with a little delay. However, since an in-phase rectangular wave voltage is input to these transistors Q7 and Q8, a time delay is very short as compared with an ON/OFF period of each switching element.

For this reason, in the inverter in this embodiment, one switching element Q3 is turned on, and a current is supplied from the power source to the load elements L3 and EL. Thereafter, the other switching element Q7 is turned on from an OFF state, and energy stored in the load is discharged. These operations are alternately repeated at a predetermined period, and an AC current is supplied to the load. During these operations, in the inverter in this embodiment, a time period required for switching from a state wherein a current is supplied to the load to a state wherein the energy is discharged is very short, and both the switching elements Q7 and Q8 can be switched with little delay. Therefore, the load is not opened during switching, and an AC current can be supplied in an ideal state.

Furthermore, in the inverter in this embodiment, both of the pair of switching elements need not be simultaneously turned off, unlike in the embodiment shown in FIG. 2. Therefore, a time period required to supply power from the power source to the load can be prolonged, and power is efficiently supplied to the load, thus realizing high brightness.

Moreover, since an in-phase rectangular wave voltage is input to both the switching elements Q7 and Q8, an oscillation circuit of a rectangular wave voltage can be simplified, thus achieving low cost.

In the embodiment shown in FIG. 10, the collectors of the transistors Q7 and Q8 ar connected to each other through series-connected diodes D3 and D4.

The diodes D3 and D4 are forward-connected to the transistors Q7 and Q8.

In this switching or output circuit 4, transistors Q5 and Q6 are alternately and repeatedly turned on/off in response to a rectangular wave input voltage from an oscillation circuit 3. In addition, the transistors Q7 and Q8 are alternately turned on/off by resistors R8, R9, R10, and R11.

A reactor L3 is connected to a node between the diodes D3 and D4, and one end of the EL lamp EL is connected to the node between diodes D3 and D4 through the reactor L3. More specifically, the EL lamp EL and the reactor L3 are connected in series, and the EL lamp EL is connected as a load of the output circuit 4.

The transistors Q7 and Q3 in the output circuit 4 are repeatedly and alternately turned on/off. When the transistor Q7 is OFF and the transistor Q8 is ON, a current is supplied from a power source EL lamp EL, reactor L3 and transistor Q8 to the load. In contrast to this, when the transistor Q7 is ON and the transistor Q8 is OFF, a current is supplied to the load elements EL and L3 in the reverse direction from the transistor Q7. Therefore, the output circuit 4 supplies a rectangular-waveform output to the series resonance circuit of the EL lamp EL and the reactor L3

A pulse voltage having a rectangular waveform supplied from the transistors Q7 and Q8 to the load elements EL and L3 causes the capacitive EL lamp EL and reactor L3 to resonate, thus applying a high voltage to the EL lamp.

Figure 11:
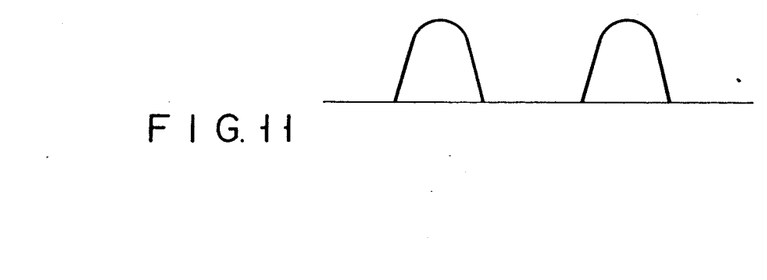
FIG. 11 is a graph showing a waveform of a voltage at a node B in FIG. 10.

When a voltage at a power supplying point between elements EL and L3 is shifted in the reverse direction due to series resonance with the load elements EL and L3, the diodes D3 and D4 connected in series with the transistors Q7 and Q8 serving as switching elements cut the voltage to prevent a flow of an unnecessary current to the transistors Q7 and Q8 in the reverse direction, as shown in FIG. 11. In addition, the diodes D3 and D4 allow smooth ON/OFF-switching to prevent heat generation of the switching elements Q7 and Q8.

Figure 12:
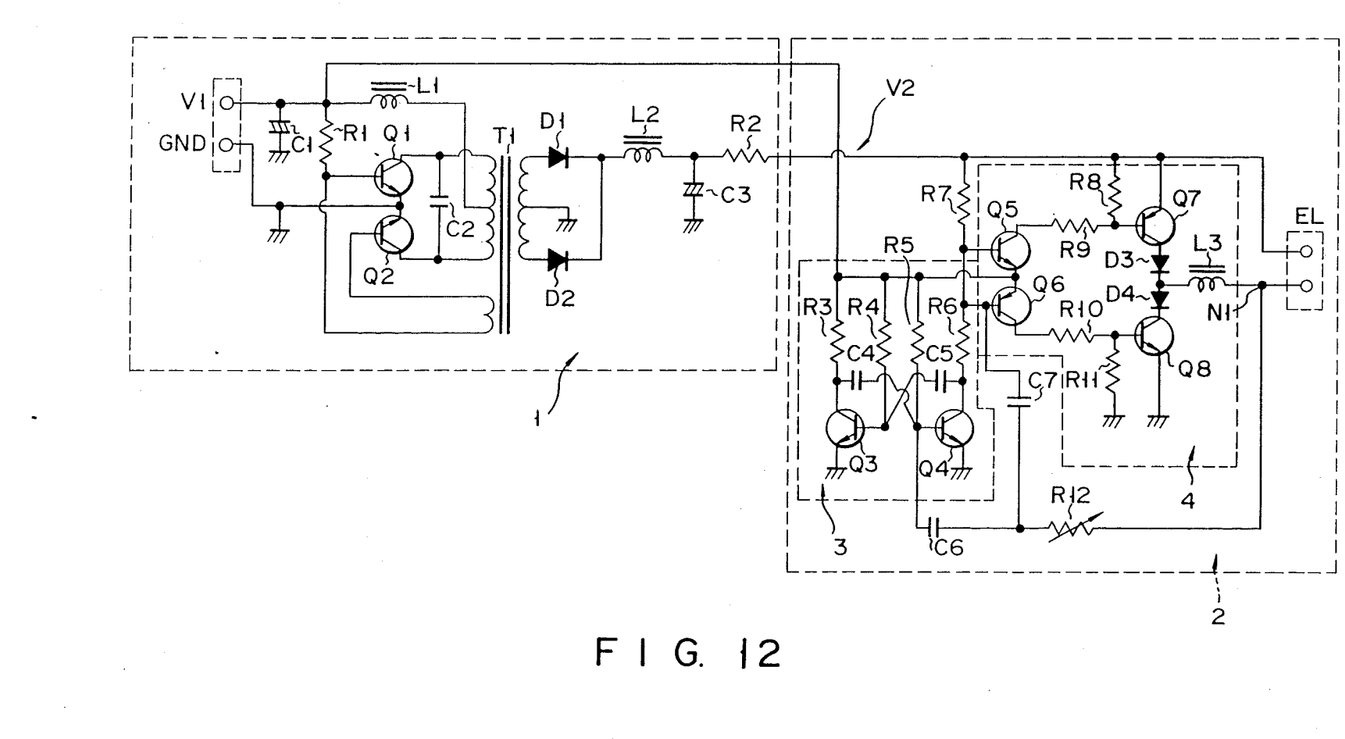
FIG. 12 is a circuit diagram according to still another embodiment of the present invention.

In an inverter shown in FIG. 12, feedback is performed from a voltage generating point of a series resonance circuit consisting of an EL lamp EL and a reactor L3 to an oscillation circuit 3 in order to pull in an oscillation frequency of the oscillation circuit 3 into a resonance frequency of the series resonance circuit. In this inverter, feedback is performed from a node N1 of the reactor L3 and the EL lamp EL to the oscillation circuit 3 through a variable resistor R12 and a capacitor C6.

A feedback amount from the resonance circuit of the EL lamp EL and the reactor L3 can be controlled by the variable resistor R12. If a resistance value of the resistor R12 is small, a feedback amount is increased, and the oscillation frequency of the oscillation circuit 3 is more strongly pulled in into the resonance frequency. In contrast to this, if the resistance value of the resistor R12 is large, a feedback amount from the resonance circuit of the EL lamp EL and the reactor L3 is decreased, and the oscillation frequency is pulled in only weakly. The oscillation circuit 3 is oscillated at a frequency close to a free-running oscillation frequency of the multivibrator in the oscillation circuit 3.

The resistor R12 is adjusted to control a feedback amount from the resonance circuit of the EL lamp EL and the reactor L3 to the oscillation circuit 3. A shift between the resonance frequency determined by the resonance circuit of the EL lamp EL and the reactor L3 and an actual oscillation frequency of the oscillation circuit 3 is controlled to always apply an optimal frequency to the EL lamp EL.

When the EL lamp EL is degraded over time, a capacitance component thereof is decreased. A resonance frequency is increased with this change to move to a new optimal point. For this reason, a frequency and a voltage supplied to the EL lamp EL are gradually increased, and a reduction in luminance can be suppressed for a long time period.

In the inverter shown in FIG. 12, feedback is also performed from a voltage generating point N1 of the resonance circuit of the EL lamp EL and the reactor L3 to the input side of the output circuit 4.

Feedback to the output circuit 4 is performed through the resistor R12 and a capacitor C7. The feedback is performed from the node N1 of the EL lamp EL and the reactor L3 to the bases of transistors Q5 and Q6 at the input side of the output circuit 4 through the series-connected resistor R12 and capacitor C7.

The resistor R12 and the capacitor C7 feed back a part of a sine wave from the resonance circuit of the EL lamp EL and the reactor L3 to the bases of the transistors Q5 and Q6 of the output circuit 4. This feedback controls a timing at which the transistors Q7 and Q8 are alternately turned on/off, and supplies a rectangular wave voltage having a duty factor of about 50% to a load of the resonance circuit constituted of the reactor L3 and the EL lamp EL.

In the resonance circuit of the EL lamp EL and the reactor L3 to which a rectangular wave voltage having a duty factor of approximately 50%, a sine wave without distortion is supplied, and a resonance effect is improved, thus allowing efficient light-emission of the EL lamp EL.

In the inverter shown in FIG. 12, the switching elements Q7 and Q8 are ON/OFF-controlled by the single oscillation circuit 3. Therefore, an oscillation frequency of the oscillation circuit 3 can be controlled by a simple feedback circuit, thus causing the EL lamp EL to efficiently emit light for a long time period.

What is claimed is:

1. An electro-luminescence device lighting inverter comprising:
    a DC-DC step-up circuit for boosting an input voltage to an electro-luminescence device lighting DC voltage, an oscillation frequency of said DC-DC step-up circuit being set to be higher than an audible frequency; and
    a DC-AC converter for converying a DC output from said DC-DC step-up circuit into an AC output of the electro-luminescence device lighting DC voltage; wherein
    said DC-AC converter is provided with an electro-luminescence device lighting oscillation circuit for oscillating a lighting signal having a predetermined frequency, and a switching circuit, controlled in response to the lighting signal from said electro-luminescence device lighting oscillation circuit, for converting a DC output from said DC-DC step-up circuit into the AC output;
    said switching circuit includes transistors ON/OFF-controlled in response to the lighting signal from said electro-luminescence device lighting oscillation circuit; and
    said AC output is supplied to the electro-luminescence device via a reactor connected in series with said electro-luminescence device to form a series resonance circuit generating a resonance voltage with a frequency lower than the predetermined frequency of the lighting signal.

2. An inverter according to claim 1, wherein said reactor is connected between an output terminal of said DC-AC converter and said electro-luminescence device, and a sine-wave voltage applied to said electro-luminescence device is changed by utilizing a shift of the resonance frequency in accordance with a change in capacitance of said electro-luminescence device over time.

3. An inverter according to claim 1, wherein a voltage limiting element is connected in parallel with said electro-luminescence device.

4. An inverter according to claim 1, wherein a voltage limiting element is connected in parallel with said reactor.

5. An electro-luminescence device lighting inverter comprising:
    a DC-DC step-up circuit for boosting an input voltage to an electro-luminescence device lighting DC voltage, an oscillation frequency of said DC-DC step-up circuit being set to be higher than an audible frequency; and a DC-AC converter for converting a DC output from said DC-DC step-up circuit into an AC output of the electro-luminescence device lighting DC voltage; wherein said DC-AC converter is provided with an electro-luminescence device lighting oscillation circuit for oscillating a lighting signal having a predetermined frequency, and a switching circuit, controlled in response to the lighting signal from said electro-luminescence device lighting oscillation circuit, for converting a DC output from said DC-DC step-up circuit into the AC output;

said switching circuit includes transistors ON/OFF-controlled in response to the lighting signal from said electro-luminescence device lighting oscillation circuit;

said transistors of said switching circuit are connected in series with each other, and are connected across output terminals of said DC-DC step-up circuit; and said AC output is supplied to the electro-luminescence device via a reactor connected in series with said electro-luminescence device to form a series resonance circuit generating a resonance voltage with a frequency lower than the predetermined frequency of the lighting signal.

6. An electro-luminescence lamp driving apparatus comprising:

A voltage control circuit for changing an input voltage into an electro-luminescence lamp lighting voltage, and converting the electro-luminescence lamp lighting voltage into a DC voltage; and a DC-AC converter for converting the DC voltage from said voltage control circuit into an AC output; wherein said DC-AC converter is provided with an oscillation circuit for oscillating a lighting signal having a predetermined frequency, and an output circuit for power-amplifying the lighting signal from said oscillation circuit;

the lighting signal outputted from said oscillation circuit is a rectangular wave voltage;

said oscillation circuit includes a specific element having the predetermined frequency of a free-running oscillation;

said output circuit includes a switching circuit for performing an ON/OFF operation;

said switching circuit of said output circuit is ON/OFF-controlled in response to the rectangular wave voltage which is an output from said oscillation circuit;

a series resonance circuit includes a reactor connected in series with the electro-luminescence lamp to form a series resonance circuit connected to an output side of said output circuit as a load to generate a resonance voltage having a frequency different from the predetermined frequency of said oscillation circuit by a given value; and a voltage generating point of said series resonance circuit of said electro-luminescence lamp and said reactor is connected to an input side of said oscillation circuit, and the resonance signal of said resonance circuit is fed back to said oscillation circuit.

7. An inverter for an electro-luminescence lamp comprising:

a voltage control circuit for changing an input voltage into an electro-luminescence lamp lighting voltage, and converting the electro-luminescence lamp lighting voltage into a DC voltage; and a DC-AC converter for converting the DC voltage from said voltage control circuit into an AC output; wherein said DC-AC converter is provided with an oscillation circuit for oscillating a lighting signal having a predetermined frequency, and an output circuit for power-amplifying the lighting signal from said oscillation circuit;

the lighting signal outputted from said oscillation circuit is a rectangular wave voltage;

said oscillation circuit includes a specific element having the predetermined frequency of 200 Hz to 5000 Hz;

said output circuit includes a switching circuit for performing an ON/OFF operation;

said switching circuit of said output circuit is ON/OFF-controlled in response to the rectangular wave voltage which is an output from said oscillation circuit;

a series resonance circuit includes a reactor connected in series with the electro-luminescence lamp to form the series resonance circuit connected to an output side of said output circuit as to load to generate a resonance voltage having a frequency different from the predetermined frequency of said oscillation circuit by a given value;

a voltage generating point of said series resonance circuit of said electro-luminescence lamp and said reactor is connected to an input side of said oscillation circuit, and the resonance signal of said resonance circuit is fed back to said oscillation circuit; and the voltage generating point of said series resonance circuit of said electro-luminescence lamp and said reactor is connected to an input side of said oscillation circuit, and the resonance circuit of said electro-luminescence lamp and said reactor is fed back to the input side of said output circuit.

8. An inverter for lighting an electro-luminescence lamp comprising:

a DC-DC step-up circuit for boosting an input voltage to an electro-luminescence lamp lighting voltage, and converting the boosted voltage into a DC voltage; and a DC-AC converter for converting a DC output from said DC-DC step-up circuit into an AC output of the electro-luminescence device lighting DC voltage; wherein said AC-DC converter is provided with an electro-luminescence lamp lighting oscillation circuit for oscillating a lighting signal having a predetermined frequency, and an output circuit for power-amplifying the lighting signal from said electro-luminescence lamp lighting oscillation circuit;

the lighting signal outputted from said electro-luminescence lamp lighting oscillation circuit is a rectangular wave voltage having an oscillation frequency of 400 Hz to 5000 Hz;

said output circuit includes a pair of switching elements for performing an ON/OFF operation;

said switching elements are connected in series with each other through diodes;

an in-phase rectangular wave voltage is input to said pair of series-connected switching elements, and said switching elements are alternately ON/OFF-controlled in response to the in-phase rectangular wave voltage;

a series resonance circuit including a reactor connected in series with said electro-luminescence lamp to form a series resonance circuit generating a resonance voltage with a frequency different from the predetermined frequency of said oscillation circuit;

said series resonance circuit of said reactor and said electro-luminescence lamp is connected to an intermediate point between said series-connected switching elements through said diodes; and said diodes connected in series with said switching elements are connected to said switching elements in a forward direction with respect to said switching elements.

* * * * *